United States Patent [19]
Akashi

[11] Patent Number: 5,848,175
[45] Date of Patent: Dec. 8, 1998

[54] VIEW POINT DETECTING DEVICE

[75] Inventor: Akira Akashi, Yokohama, Japan

[73] Assignee: Canon Kabushiki Kaisha, Tokyo, Japan

[21] Appl. No.: 387,614

[22] Filed: Feb. 13, 1995

Related U.S. Application Data

[63] Continuation of Ser. No. 888,495, May 27, 1992, abandoned.

[30] Foreign Application Priority Data

| May 27, 1991 | [JP] | Japan | 3-121091 |
| May 27, 1991 | [JP] | Japan | 3-121092 |
| May 27, 1991 | [JP] | Japan | 3-121093 |
| May 27, 1991 | [JP] | Japan | 3-121094 |
| May 27, 1991 | [JP] | Japan | 3-121097 |
| May 27, 1991 | [JP] | Japan | 3-121098 |
| May 27, 1991 | [JP] | Japan | 3-121099 |

[51] Int. Cl.$^6$ ............................................. G06K 9/00
[52] U.S. Cl. ............................ 382/115; 382/117; 382/318
[58] Field of Search ................................ 382/2, 62, 115, 382/117, 318, 128, 103; 351/207, 208, 209, 210; 354/62, 400, 410

[56] References Cited

U.S. PATENT DOCUMENTS

| 4,574,314 | 3/1986 | Weinblatt | 354/400 |
| 4,836,670 | 6/1989 | Hutchinson | 351/210 |
| 5,036,347 | 7/1991 | Tsunekawa et al. | 354/62 |
| 5,231,674 | 7/1993 | Cleveland et al. | 382/6 |

FOREIGN PATENT DOCUMENTS

| 61-172552 | 8/1986 | Japan . |
| 1-241511 | 9/1989 | Japan . |
| 2-5 | 1/1990 | Japan . |

*Primary Examiner*—Phuoc Tran
*Attorney, Agent, or Firm*—Fitzpatrick, Cella, Harper & Scinto

[57] ABSTRACT

A disclosed device detects an observer's visual axis bi-directionally, comprising a light receiver for receiving light from the observer's eyeball via multiple photoelectric transfer element arrays, a first storage means for storing positions of photoelectric transfer elements outputting signals representing Purkinje images; a second storage for referencing the photoelectric transfer signals originating from multiple photoelectric transfer elements arranged in the horizontal and vertical directions of the light receiver, and storing the positions of photoelectric transfer elements that indicate characteristic points representing the pupil of an eyeball, and a detector for detecting a view point using the positional information stored in the first and second storages.

18 Claims, 13 Drawing Sheets

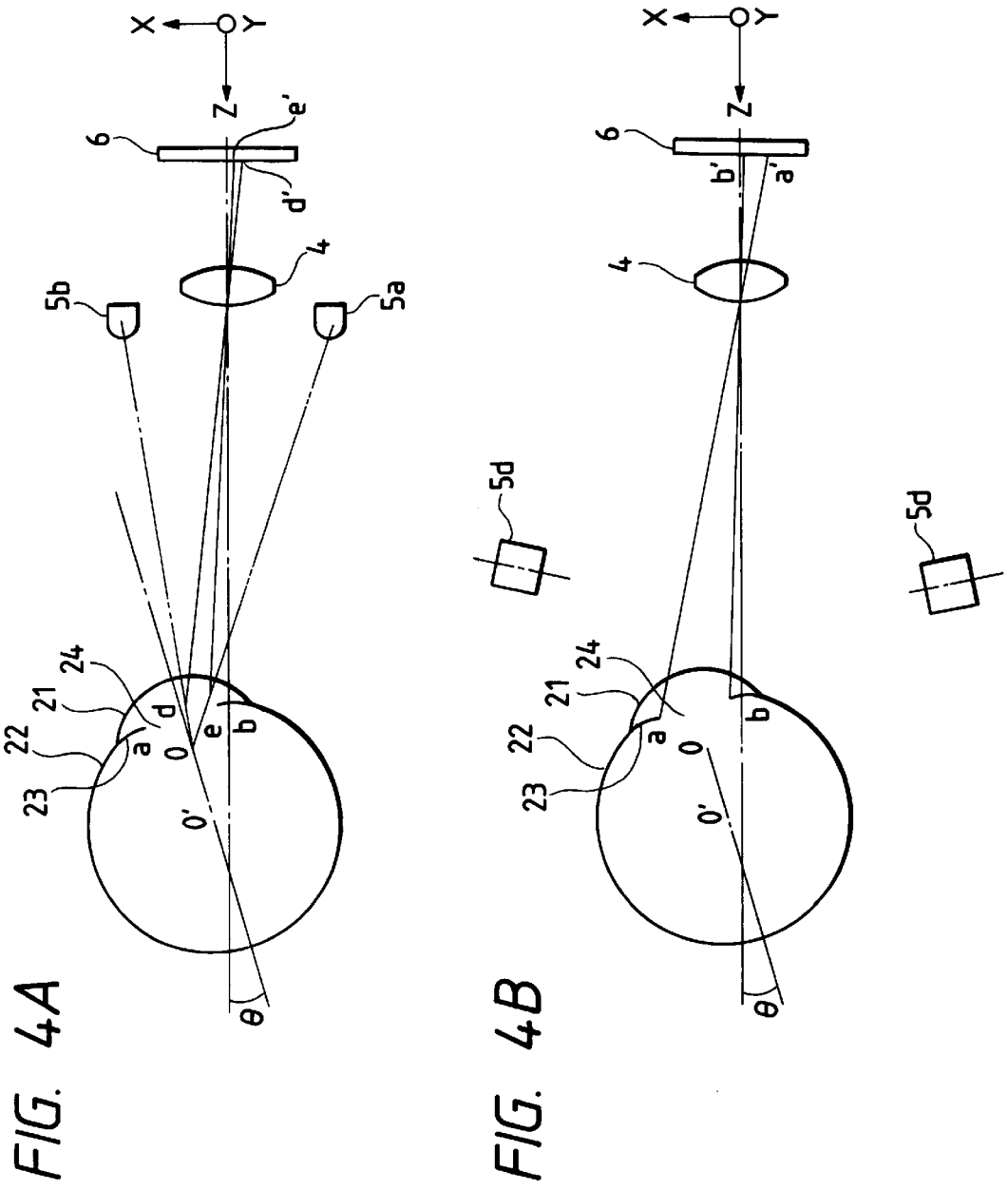

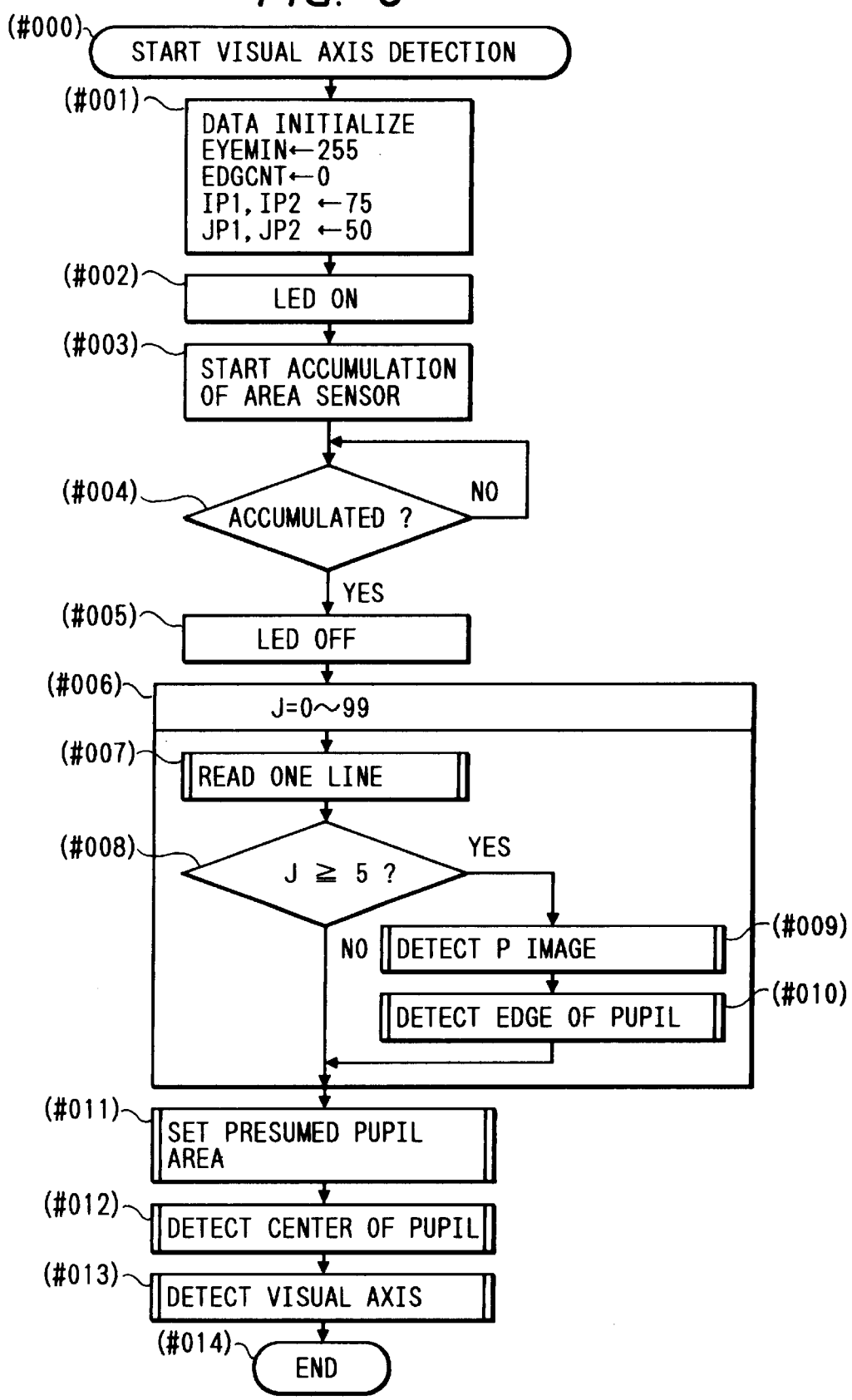

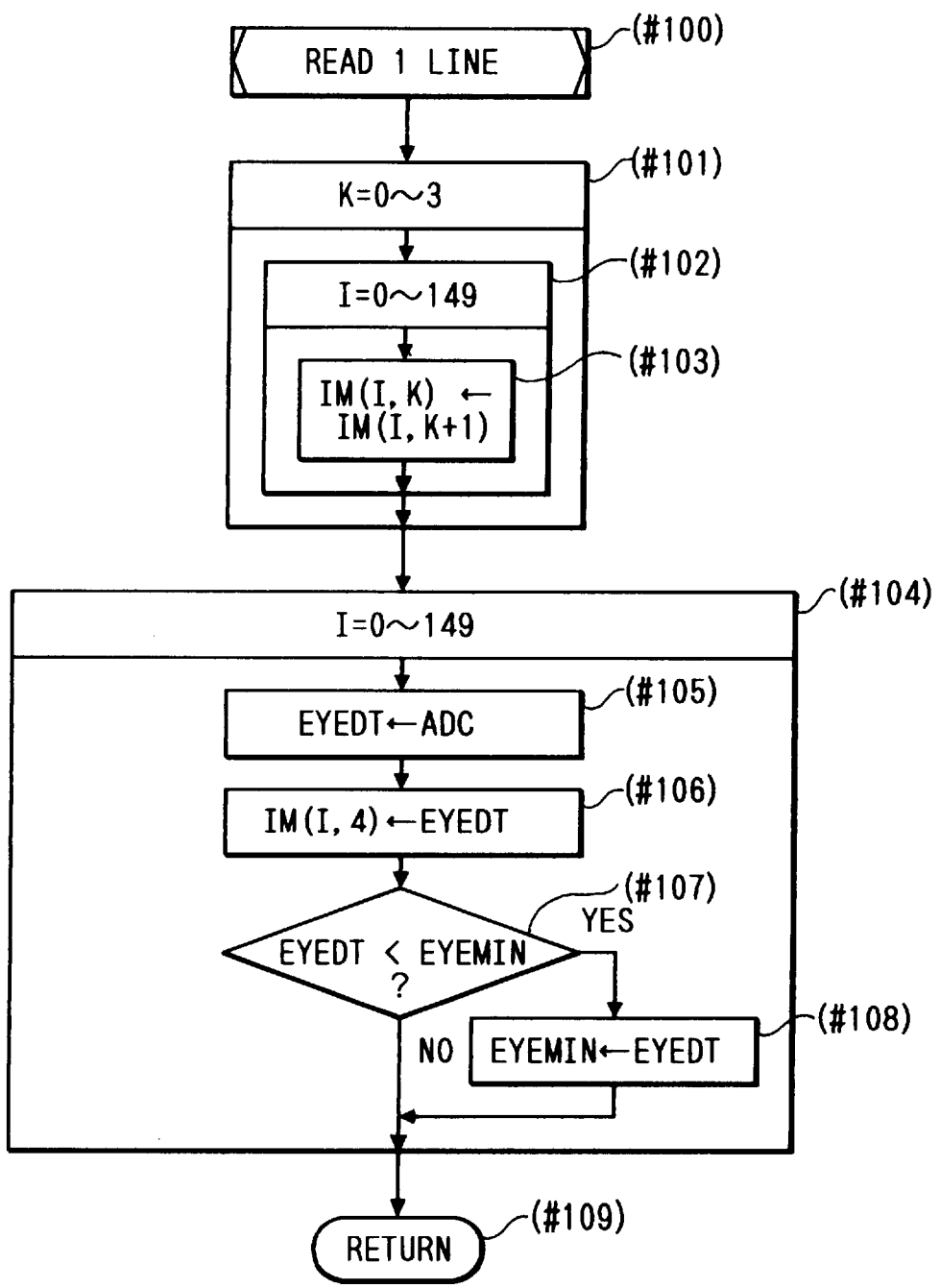

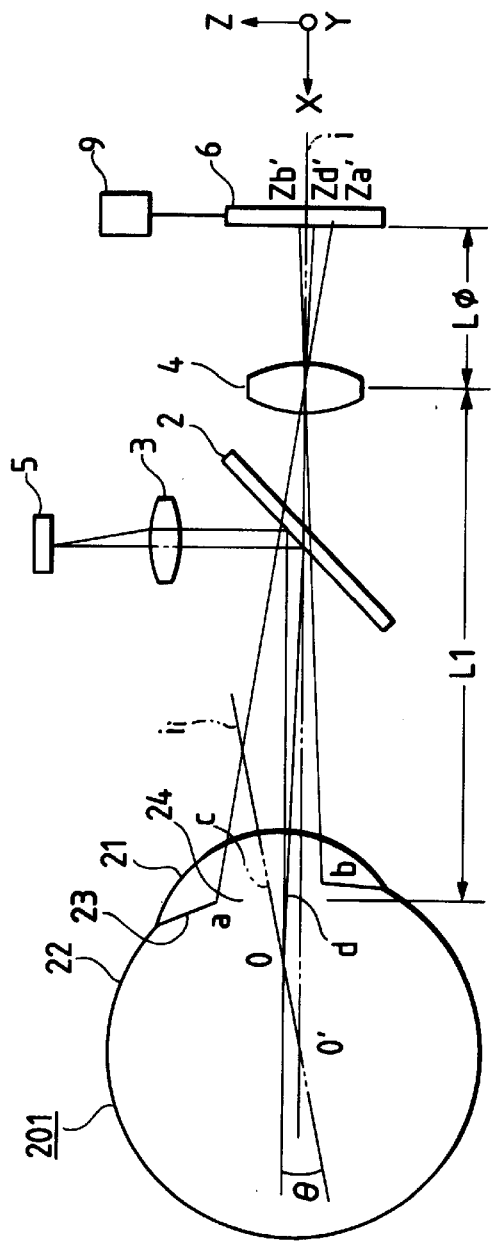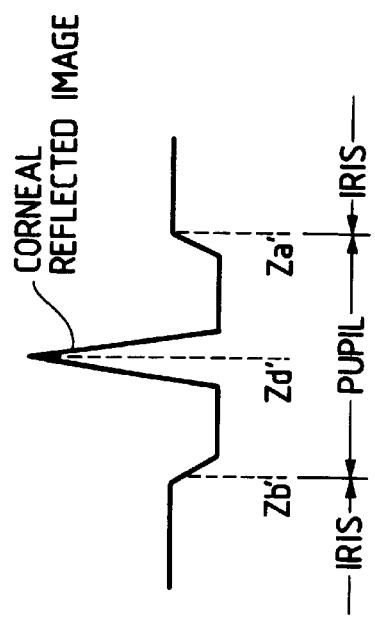

VIEW POINT DETECTING DEVICE

This application is a continuation of application Ser. No. 07/888,495 filed May 27, 1992, now abandoned.

BACKGROUND OF THE INVENTION

1. Field of the Invention

The present invention relates to a visual axis detecting device for detecting the visual axis (view point) of an observer who uses a camera or other optical equipment.

2. Related Background Art

Disclosed in Japanese Patent Laid-Open Application Nos. 61-172552, 1-241511, or 2-5 is a so-called visual axis detecting device for detecting a position on an observation plane at which an observer is looking using an optical apparatus.

For example, Japanese Patent Laid-Open Application No. 61-172552 describes that parallel beams from a light source are projected to the anterior chamber of an observer's eyeball, and a corneal reflection image produced with light reflected from the cornea and the image forming position on the pupil are used to calculate a visual axis. FIGS. 15A and 15B are explanatory diagrams for explaining the principles of a visual axis detecting procedure. FIG. 15A is a schematic diagram of a visual axis detection optical system, and FIG. 15B shows the strengths of output signals from a photoelectric element array 6.

In FIG. 15A, 5 denotes a light emitting diode or other light source for emitting infrared light to which an observer's eye is not sensitive. The light source 5 is arranged on a focal plane of a light projection lens 3.

The infrared ray emitted from the light source 5 passes through the light projection lens 3 to provide parallel light. The parallel light is reflected from a half mirror 2 to illuminate the cornea 21 of an eyeball 201. At this time, a part of the infrared light reflected from the surface of the cornea 21 forms corneal reflection image d. The corneal reflection image d transmits through the half mirror 2, converges on a light receiving lens 4, then reappears at a position Zd' on a photoelectric element array 6.

Beams from the edges a and b of the iris 23 (margin of the pupil) pass through the half mirror 2 and light receiving lens 4 to form the images of the edges a and b at positions Za' and Zb' on the photoelectric element array 6. When the rotation angle θ of the optical axis ii of an eyeball is smaller than that of the optical axis i of the light receiving lens 4, assuming that the z coordinates of the edges a and b of the iris 23 are Za and Zb, the z coordinate Zc of the center position c of the iris 23 is expressed as follows:

$$Zc \cong (Za+Zb)/2$$

Assuming that the z coordinate of the position d at which a corneal reflection image appears is Zd and the distance from the center of curvature O of the cornea 21 to the center C of the pupil 24 is OC, the rotation angle θ of the optical axis ii of the eyeball substantially satisfies the following relational expression:

$$OC \times \sin\theta \cong Zc - Zd \quad (1)$$

Herein, the z coordinate Zd of the position d of the corneal reflection image agrees with the z coordinate Zo of the center of curvature O of the cornea 21. Therefore, when an arithmetic logic means 9 is used to detect the positions of singular points (position d of the corneal reflection image and the edges a and b of the iris) projected onto the photoelectric element array 6 as shown in FIG. 15B, the rotation angle θ of the optical axis ii of the eyeball can be calculated. At this time, the expression (1) is rewritten as follows:

$$\beta \times OC \times \sin\theta \cong (Za'+Zb')/2 \times Zd' \quad (2)$$

where, β is a power determined by the distance L1 between the position d at which the corneal reflection image appears and the receiving lens 4 and by the distance L0 between the receiving lens 4 and the photoelectric element array 6. The β value is usually constant.

When a distance measuring point is set not only at the center of a screen but also at multiple positions in the screen in an automatic focus detector for, for example, a camera, an observer selects one of the distance measuring points to execute automatic focus detection. Herein, the observer may not select any one point. That is to say, a point at which the observer is looking is regarded as a distance measuring point. Then, the point is automatically specified as a distance measuring point. This facilitates efficiency in automatic focus detection. The related art has been disclosed in U.S. patent application Ser. Nos. 584,896 (filed on Sep. 19, 1990), 749,518 (filed on Aug. 19, 1991), 767,665 (filed on Sep. 30, 1991), and 823,773 (filed on Jan. 22, 1992).

In the aforesaid example of the prior art, an eyeball image is processed laterally (horizontally) to detect a lateral position of a pupil. Therefore, no information can be detected in the vertical (perpendicular) direction of a visual axis, in principle.

However, focus detecting points of a camera may be set in the vertical direction of a finder in the future. With the aforesaid prior art, the focus detecting points in the vertical direction cannot be specified for some visual axes. A focus detecting system supporting those focus detecting points cannot be matched with cameras smoothly.

A camera may be held vertically. In this case, no information can be detected in the lateral (horizontal) direction of a visual axis. Besides, the result is more miserable.

SUMMARY OF THE INVENTION

The first object of the present invention is to solve the aforesaid problems or to detect information in the longitudinal (vertical) direction of a visual axis by performing bi-directional that is, lateral (horizontal) and longitudinal (vertical) processing at a step of extracting the characteristics of an eyeball image (especially, the border between the pupil and iris) and at a step of calculating the position of the pupil using the result of the extraction.

To attain the above object, an embodiment of the present invention comprises a light receiving means (area sensor) for receiving light from an observer's eyeball via multiple photoelectric transfer element arrays, a first storage means for storing the positions of Purkinje images detected in photoelectric transfer signals, a second storage means for referencing the photoelectric transfer signals originating from multiple photoelectric transfer elements arranged in the horizontal and vertical directions of the light receiving means, then storing the positions of photoelectric transfer elements that indicate the characteristic points representing the pupil of the eyeball, and a detecting means for detecting a visual axis direction in the positional information stored in the first and second storage means.

In detection of a visual axis direction, the x and y coordinates of extracted pupillary edges are calculated using the least squares method to obtain a presumptive pupillary circle. Then, the coordinates of the center of the presumptive pupillary circle are used to detect a visual axis.

Least squares processing is very effective when observation points reside relatively close to the true circumference. If some false observation points are distanced even slightly from the circumference, the influence of the false observation points on the result of least squares becomes too serious to be ignored. This is a characteristic of least squares, though. Consequently, precision in visual axis detection deteriorates remarkably.

The second object of the present invention is to provide a device capable of calculating a pupillary circle more reliably to provide a precise view point.

The third object of the present invention is to provide a device capable of precisely accessing the positional information of photoelectric transfer elements in an area sensor that provide signals representing pupillary edges, then calculating a presumptive pupillary circle.

To detect a visual axis direction by processing image signals from photoelectric element arrays (area sensor), the image signals from multiple photoelectric transfer element arrays must be temporarily saved in memory prior to processing.

In general, the number of photoelectric transfer elements (pixels) of an area sensor is several tens of thousands. If all the information must be stored in memory, the memory must have an enormous capacity.

When an attempt is made to incorporate a visual axis detecting device of the present invention in a camera or any other commercial optical equipment which must be compact and low-priced, it is a problem to ensure the memory capacity. In particular, supposing a one-chip microcomputer having a built-in read only memory (hereafter, ROM) and random access memory (hereafter, RAM) is employed as a processor, the built-in RAM usually has a capacity of several kilobytes only. The employment of an external memory solves the problem of capacity but is unfavorable in terms of installation scale and cost.

The fourth object of the present invention is to solve the aforesaid problems in a device for detecting a visual axis using a memory having a smaller capacity than the number of pixels of an area sensor. The summary will be given next.

According to the present invention, image information is not stored in memory simultaneously. While time-series photoelectric transfer signals are being read, the signals are stored in memory successively. When all information necessary for processing is acquired, reading is suspended. Then, the processing is carried out. Then, the image information used for processing is not held in memory but new photoelectric transfer signals are placed in memory. Thereby, all information can be processed with a memory having a limited capacity.

The features of the present invention will be described more particularly. A light receiving means receives light from an observer's eyeball via multiple photoelectric transfer element arrays. A first storage means stores photoelectric transfer signals from part of photoelectric transfer element arrays in the light receiving means. A second means stores the positional information of photoelectric transfer elements that provide photoelectric transfer signals indicating characteristic points of the eyeball. Then, a signal processing means deletes information of the photoelectric transfer signals or part of the information stored in the first storage means, then stores new photoelectric transfer signals originating from photoelectric transfer element arrays in the first storage means. Finally, the positional information existing in the second storage means is used to detect a visual axis direction.

Other features of the present invention will be apparent in conjunction with the drawings.

BRIEF DESCRIPTION OF THE DRAWINGS

FIGS. 4A and 4B are explanatory diagrams for explaining the principles of detecting a visual axis according to the present invention;

FIG. 6 is a flowchart of detecting a visual axis according to the present invention;

FIG. 7 is a flowchart of reading one line (x-axis direction) in an area sensor;

FIGS. 15A and 15B are explanatory diagrams for explaining the principles of detecting a visual axis.

DESCRIPTION OF THE PREFERRED EMBODIMENTS

Figure 1:
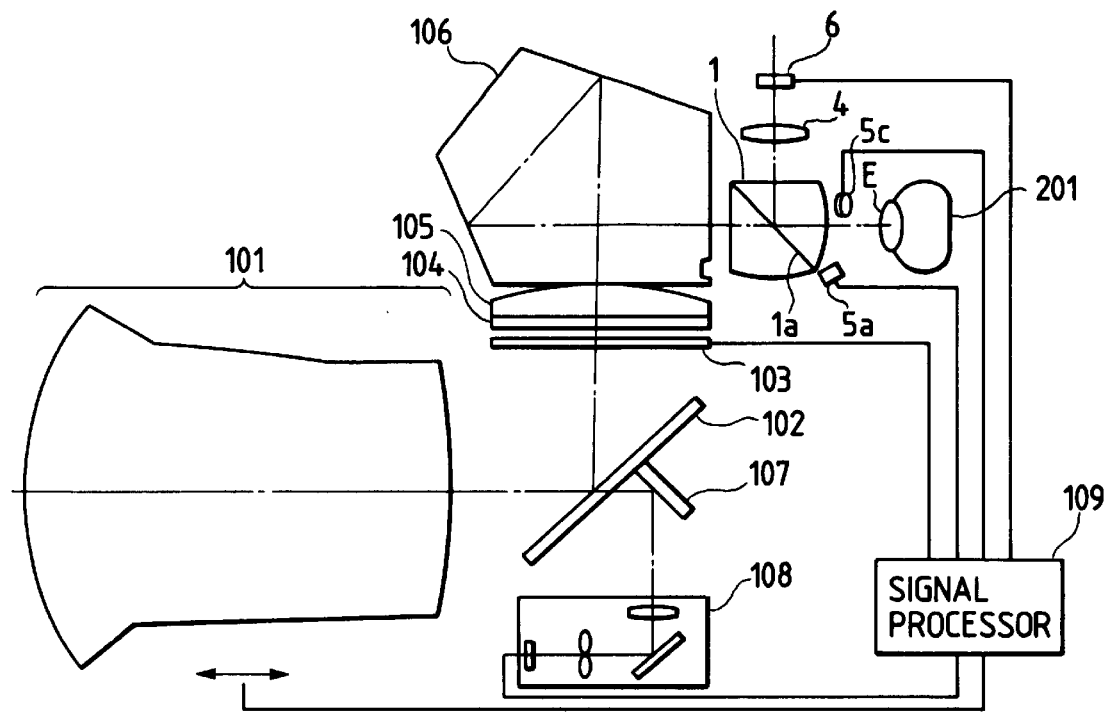
FIG. 1 is a schematic diagram of an auto-focus camera in which a visual axis detecting device of the present invention is incorporated.
Figure 2:
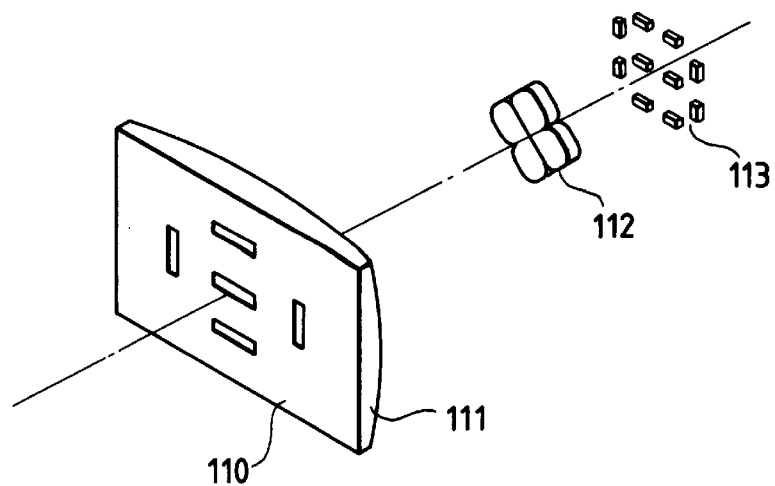
FIG. 2 is an oblique view of a focus detecting system.
Figure 3:
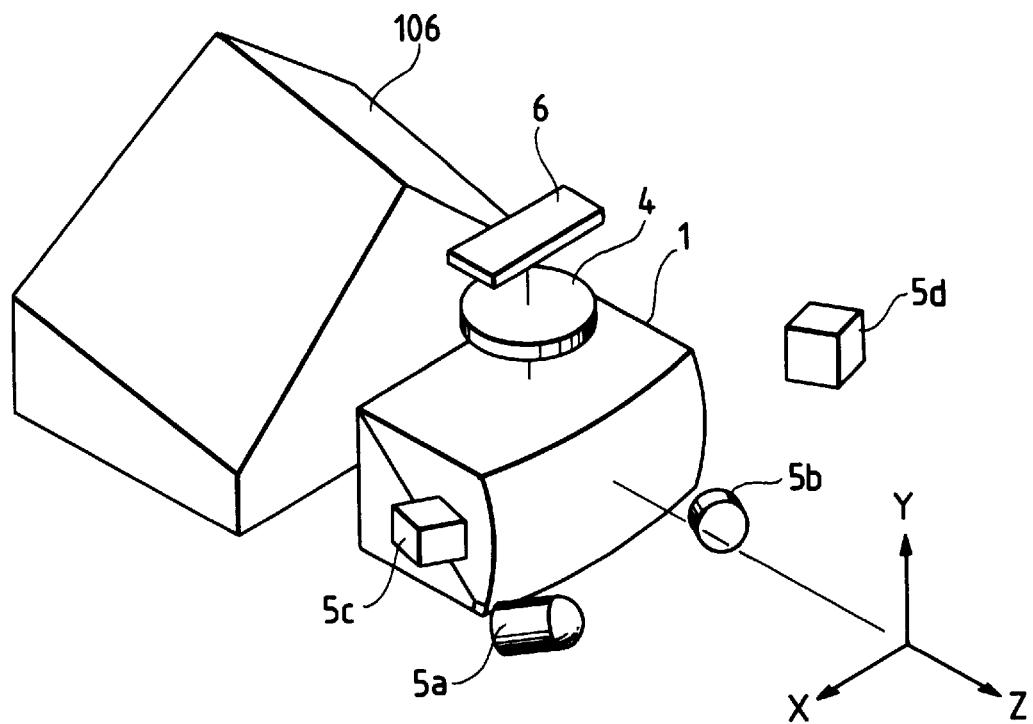
FIG. 3 is an oblique view of a visual axis detecting system according to the present invention.

FIG. 1 is a schematic diagram of an optical system of an embodiment of the present invention or a single-lens reflex camera in which the present invention is implemented. FIG. 2 is an explanatory diagram of a focus detector of the camera shown in FIG. 1. FIG. 3 is an oblique view of the main section of a visual axis detecting system in the camera of FIG. 1.

In FIGS. 1 and 3, 1 denotes an eyepiece in which a dichroic mirror 1a for transmitting visible light and reflecting infrared light is installed obliquely. The eyepiece 1 also serves as an optical path divider.

4 denotes a light receiving lens. 5 (5a, 5b, 5c and 5d) denotes illuminating means, which is made up of, for example, light emitting diodes. Among the light emitting diodes, 5a and 5b are infrared light-emitting diodes. The infrared light-emitting diodes 5a and 5b are arranged behind the eyepiece to help develop corneal reflection images. Each of the infrared light-emitting diodes 5a and 5b has an apparent size equivalent to a chip and functions like a spotlight, thus assisting in detecting high-resolution corneal reflection images.

5c and 5d are infrared light-emitting diodes arranged on the sides of the eyepiece. The infrared light-emitting diodes 5c and 5d may be characteristic of diffuseness, so that they can illuminate an entire eyeball. Alternatively, the infrared light-emitting diodes 5c and 5d may be characteristic of planar light emission. Thereby, even if the eyeball is off the optical-axis center, the deflecting visual axis of the eyeball can be covered owing to the wide illumination range of the infrared light-emitting diodes 5c and 5d. The infrared light-emitting diodes 5c and 5d are arranged so that the light receiving lens 4 will not re-form corneal reflection images on an area sensor 6.

The area sensor 6 for detecting iris information is made up of multiple photoelectric element arrays.

The light receiving lens 4 and photoelectric element arrays 6 form part of a light receiving means.

The components 1, 4, 5 and 6 form a system of detecting the visual axis of an eyeball.

101 denotes a photographic lens. 102 is a quick-return (hereafter, QR) mirror. 103 denotes a display element. 104 represents a focusing plate. 105 denotes a condenser. 106 is a pentaprism, and 107, a submirror. 108 denotes a known multipoint focus detector, which selects an area from among multiple areas in a photographic screen and detects a focus in the selected area.

The description of the multipoint focus detector is given merely briefly because it does not help understand the present invention very much.

In the present invention, as shown in FIG. 2, a field mask 110 having multiple slits each determining a distance measurement area is arranged in the vicinity of an intended image formation plane of a photographic lens 101. A lens member 111 working as a field lens for an image of each slit is arranged in close contact with the field mask 110. Pairs of re-formation lenses 112 and pairs of photoelectric element arrays 113, which are provided in one-to-one correspondence with the slits, are arranged in tandem. The slits 110, field lens 111, pairs of re-formation lenses 112, and pairs of photoelectric element arrays form a known focus detecting system.

In the present invention, part of a subject light passing through a photographic lens 101 is reflected from a QR mirror 102 to form the subject image in the vicinity of a focusing plate 104. The subject light diffused from the diffusing plane of the focusing plate 104 passes through a condenser 105, a pentaprism 106, and an eyepiece 1, then converges at an eye point E.

A display element 103 is a guest-host type liquid crystal element of two-layer type in which a deflecting plate is not installed. The display element 103 displays a distance measurement area (focus detection point) within the field of view of a finder.

Part of a subject light passing through a photographic lens 101 transmits through a QR mirror 102, which is, then, reflected from a submirror 107 and rotated to the aforesaid multipoint focus detector 108 arranged in the bottom of a camera main unit. Then, based on focus detection information concerning a position on a subject plane the multipoint focus detector 108 has selected, a photographic lens drive, which is not shown, feeds or retracts the photographic lens 101 to adjust the focus of the camera.

A signal processing circuit 109 for visual axis detection is formed with a so-called one-chip microcomputer, in which a ROM, RAM and A/D converter are incorporated. The microcomputer 109 executes a series of visual axis detecting operations using programs stored in the built-in ROM.

The procedure of detecting a visual axis will be described briefly. First, infrared light-emitting diodes 5 are turned on.

Infrared light emitted enters an eyepiece 1 from above in FIG. 1. The infrared light is reflected from a dichroic mirror 1a to illuminate an observer's eyeball 201 positioned in the vicinity of an eye point E. The infrared light reflected from the eyeball 201 is re-reflected from the dichroic mirror 1a, then transmitted by a light receiving lens 4 to form an image on an area sensor 6. The microcomputer 109 processes an eyeball image signal photoelectrically transferred by the area sensor 6 to retrieve view point (visual axis) information.

The retrieved view point information is used for multi-point focus detection and display. Specifically, focusing is done based on the result of detecting a focus for a distance measurement point closest to a view point. At the same time, a display element 103 displays the place at which an observer views through a finder of a camera, thus allowing the observer to confirm the view point.

FIGS. 4A and 4B are explanatory diagrams for explaining the principles of detecting a visual axis. In FIG. 4A, beams originating from infrared light-emitting diodes 5a and 5b arranged apart in the lateral (x-axis) direction of photoelectric element arrays 6 form corneal reflection images e and d at points distanced in the x-axis direction. At this time, the x coordinates of the center points of the corneal reflection images e and d agree with the x coordinate of the center of curvature o of a cornea 21. The gap between the corneal reflection images e and d varies proportionally to the distance between the infrared light-emitting diodes and an observer's eyeball. Therefore, a formation power of an image reflected from the eyeball can be calculated by detecting the positions e' and d' of the corneal reflection images that are re-formed on the photoelectric element arrays 6. Infrared light-emitting diodes 5c and 5d for iris information detection illuminates the eyeball from the lateral direction of a finder, which are arranged so that the corneal reflection images will not be re-formed on the photoelectric element arrays 6 through a light receiving lens 4. This prevents a flared image due to unnecessary light from appearing at the points a and b on the border between the iris and cornea imaged on the photoelectric element arrays 6, and hinders deterioration of precision in detecting the border points a and b.

Figure 5A:
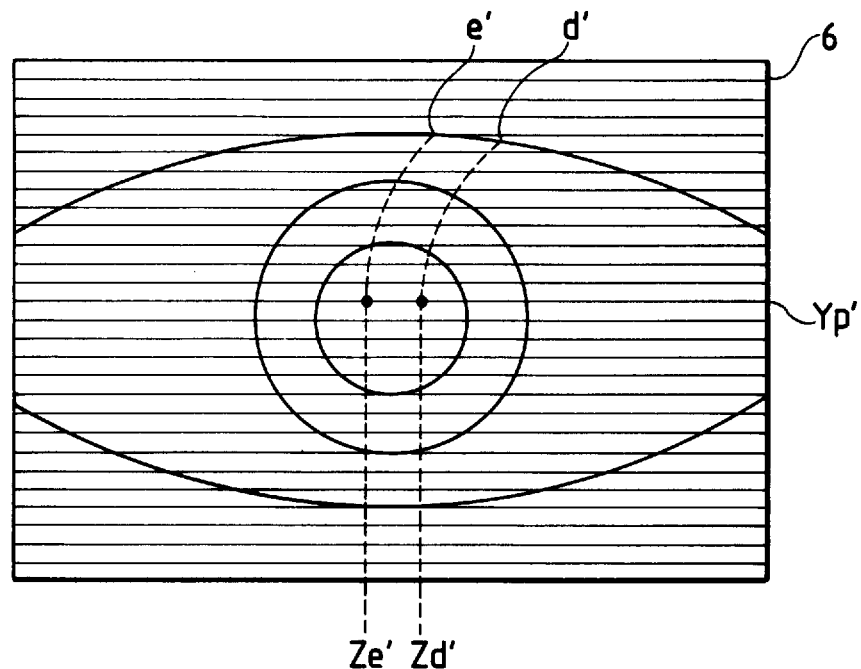
FIGS. 5A and 5B show distribution of optical strengths in an area sensor according to the present invention.
Figure 5B:
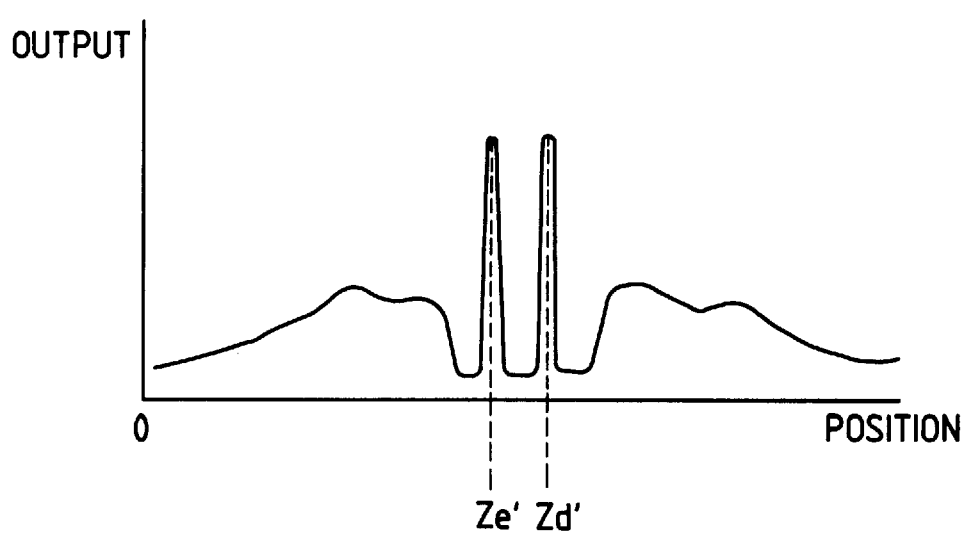

FIG. 5A is an explanatory diagram showing an image reflected from an eyeball that is projected on an area sensor 7 made up of multiple photoelectric element arrays 6 in the present invention. In FIG. 5A, corneal reflection images e' and d' are re-formed on photoelectric element arrays Yp'. FIG. 5B shows an example of the output signals of the photoelectric element arrays Yp' that represent distribution of optical strengths.

As described previously, a microprocessor 109 detects the position of the center of a pupil and the positions of corneal reflection images e' and d' in a sensor signal shown in FIGS. 5A and 5B, then determines a view point (visual axis) based on the positional relations.

FIGS. 6 and thereafter are flowcharts for a microcomputer 109 serving as a signal processor in this embodiment of the present invention.

FIG. 6 is a main flowchart of detecting a visual axis. When a microcomputer 109 starts a visual axis detecting operation at a step 000, data initialization is executed at a step 001.

A variable EYEMIN takes on the smallest luminance value among the luminance values indicated in the photo-electric transfer signals of an eyeball reflection image. It is assumed that an A/D converter incorporated in a microcomputer 109 has a resolution of 8 bits. Every time an image signal is read, the image signal is compared with the smallest value. Then, the smallest value is updated accordingly. 255 or a maximum value expressed with 8 bits is stored as the initial value.

A variable EDGCNT is incremented to count up extracted edges or points on the border between the iris and pupil.

Variables IP1, IP2, JP1 and JP2 specify the positions of corneal reflection images (hereafter, called a Purkinje image or P image) of light emitting diodes 5a and 5b. Two P images reside in an area of an eyeball reflection image that is confined to a range of IP1 to IP2 in the lateral (x-axis) direction and a range of JP1 to JP2 in the longitudinal (y-axis) direction.

Assume that an area sensor 7 has 150 pixels laterally and 100 pixels longitudinally. (75, 50) indicating the central position of the pixel size are stored as initial values for the ranges of IP1 to IP2, and JP1 to JP2.

After completing data initialization, control passes to a step 002.

At the step 002, P image light emitting diodes 5a and 5b, and eyeball illumination light emitting diodes 5c and 5d are turned on. At the next step 003, the area sensor 7 is energized to start accumulating charges. Sensor control has no direct relation to the present invention. The detailed description will, therefore, be omitted. In the embodiment of the present invention, a sensor interface circuit, which is not shown, controls drive of the area sensor 7.

At a step 004, control waits for the area sensor to complete accumulating charges.

When accumulating charges is complete, the light emitting diodes are turned off at a step 005.

At a step 006, processing is started to read photoelectric transfer signals from the area sensor.

At the step 006, a loop variable J is incremented from 0 to 99. In the meantime, processing encircled in FIG. 6, or a loop, is executed.

In the loop entered at the step 006, a photoelectric transfer signal representing one lateral (x axis) line of the area sensor is read at a step 007. One-line reading is performed as a subroutine. FIG. 7 is a flowchart of a subroutine "One-line Read."

When the One-line Read subroutine is called at a step 100 in FIG. 7, the operation of a step 101 is executed. At the step 101 and a step 102 within the enclosure in FIG. 7, a loop similar to that of the aforesaid step 006 is executed. At the step 101, a variable K is incremented from 0 to 3. In the meantime, a variable I is incremented from 0 to 149 at the step 102. In parallel with the increment, the operations within the enclosures are executed. Thus, the loop of the step 102 having the variable I is nested within the loop of the step 101 having the variable K.

At a step 103 within the loop of the step 102, an array variable IM (i, k) is re-stored.

In this embodiment, a microcomputer 109 processes signals. The storage capacity of a built-in RAM of a general microcomputer is not large enough to store all pixel information of an area sensor at one time. In this embodiment, image signals sent from the area sensor are read one after another, and only the latest image signals corresponding to five lateral (x-axis) lines are put in the built-in RAM of a computer. Thus, every time one line is read, visual axis detection is executed.

When a double loop is executed at steps 101 to 103, the stored past image signal data of five lines is updated in order to read new image signals for one line. Specifically, an array variable IM (i, k) specifies the oldest one-line image data as IM (i, 0) (i=0 to 149) and the latest one-line image data as IM (i, 4) (i=0 to 149). Data is updated as shown below, so that new image signal data of one line can be stored as IM (i, 4) (i=0 to 149).

IM (i, 1) to IM (i, 0)

IM (i, 2) to IM (i, 1)

IM (i, 3) to IM (i, 2)

IM (i, 4) to IM (i, 3) (i=0 to 149)

When the data update loops of the steps 101 to 103 terminate, the loop of the next step 104 is executed.

In the loop of the step 104, image signals for one lateral (x-axis) line (150 pixels) of an area sensor are stored in a RAM while being converted to digital signals successively, and minimum values are detected in the image signals.

At the first step 105 within the loop of the step 104, a digital value ADC of a digitized image signal is accessed from an A/D converter incorporated in a microcomputer 109. The value is stored temporarily as a variable EYEDT. Then, at the next step 106, the EYEDT value is stored as an array variable IM (I, 4). A variable I is incremented from 0 to 149 at the step 104 of a loop nested outermost.

At steps 107 and 108, a minimum is detected in an image signal. The variable EYEMIN holds a minimum image signal value. At the step 107, if EYEDT is smaller than EYEMIN, control branches to a step 108. EYEMIN is updated to EYEDT.

After the loops of the steps 104 to 108 terminate, when new image signals for one line have been stored and the minimum values have been detected, the One-line Read subroutine is returned at the next step 109.

In the flowchart of FIG. 6, after the One-line Read subroutine of the step 007 is complete, control passes to the next step 008. Then, it is checked if a loop variable J of the loop nested outermost at the step 006 exceeds 5.

The loop variable J specifies a pixel line in the longitudinal (y-axis) direction of the area sensor. In this embodiment, the area sensor is 150 by 100 pixels in size. J is incremented from 0 to 99.

If the loop variable J exceeds 5 at the step 008, control branches to a step 009. If read image signals represent more than five lines, information in the longitudinal (y-axis) direction of the area sensor can be handled.

At the step 009 at which control has branched, a subroutine "P-image Detection" is executed.

Figure 8:
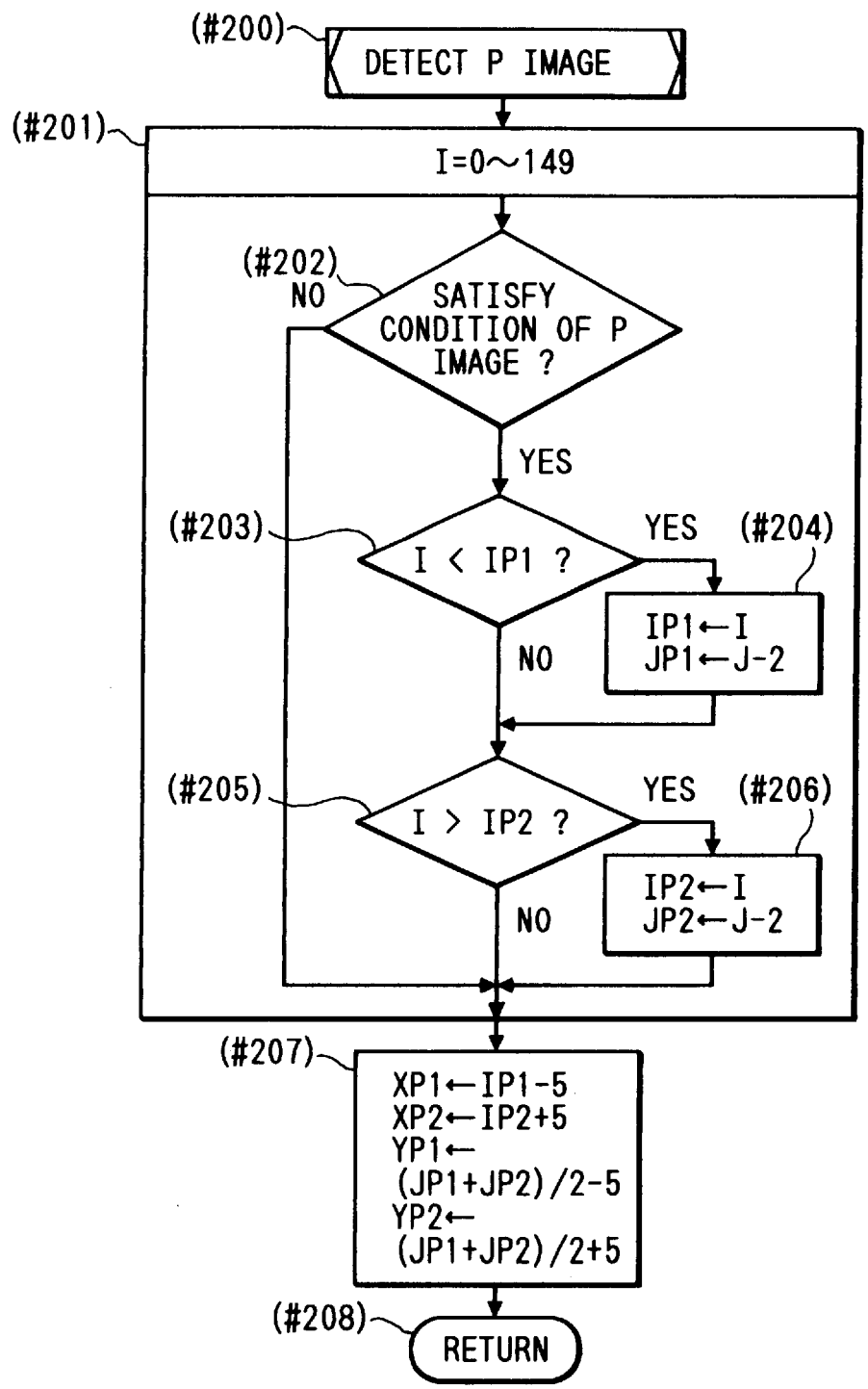
FIG. 8 is a flowchart of detecting a P image.

The P-image Detection subroutine detects the positions of corneal reflection images (P images) mentioned above, which is executed every time one line is read in the lateral (x-axis) direction of the area sensor. FIG. 8 is the flowchart.

When the P-image Detection subroutine is called at a step 200, the loop of a step 201 is executed. Within the loop, image data (stored as an array variable IM (i, k)) is searched for the positions of P images. If the positions of P images are found, the corresponding positions in the area sensor are stored. In this embodiment, the number of P images is two. Therefore, two values of positional information are stored.

At the first step 202 within the loop, it is determined whether image data at a given position satisfies the conditions for a P image. The conditions are as listed below.

The conditions for a P image used at the step 202 are:

$IM(1, 2) > C1$, $IM(I, 1) > C2$, $IM(I, 3) > C2$, $IM(I-1, 2) > C2$, and $IM(I+1, 2)>C2$ However, since C1 and C2 are thresholds and constants, C1 may be equal to or smaller than C2. For example, C1=230 and C2=200. The variable I is a loop variable of a loop, representing a lateral (x-axis) position in the area sensor.

As described in conjunction with FIG. 5, a P image is a spot-like image. From this viewpoint, the above conditions define both the lateral (x-axis) and longitudinal (y-axis) positions. When the conditions are met, a P image is thought to reside at a position (I, 2).

As described previously, the array variable area IM(i, k) is updated every time one line is read in the lateral (x-axis) direction of the area sensor. The lateral (y-axis) J line is stored as IM(i, 4) (i=0 to 149). Therefore, the address (1, 2) of the variable IM corresponds to a position (I, J−2) in the area sensor.

At a step 202, if any image data meets the conditions for a P image, control branches to the step 203 or thereafter. If no image data meets the conditions, the loop variable I of a loop nested outermost is incremented.

At the steps 203 and thereafter, the ranges in which two P images reside are determined (within an x-axis range of IP1 to IP2 and a y-axis range of JP1 to JP2).

At the step 203, a variable I specifying the lateral position (x coordinate) in the area sensor is compared with a variable IP1. If I<IP1, control branches to a step 204. Specifically, if the variable I points to a position on the left of the position IP1 or a leftmost position of the x-axis range of a P image, IP1 is rewritten.

At a step 204, the value of the variable I is stored as the variable area IP1. The longitudinal position (J−2) is stored as a variable area JP1.

At steps 205 and 206, it is determined whether IP2 representing an x-axis rightmost position of a P image and JP2 representing the y-axis position have been updated.

As described above, within a loop of a step 201, one-line processing is repeated for the lateral (x-axis) position I ranging from 0 to 149. After that, control passes to the next step 207.

At the step 207, variables XP1, XP2, YP1 and YP2 to be referenced at later steps are calculated according to the expressions in FIG. 8.

Figure 12:
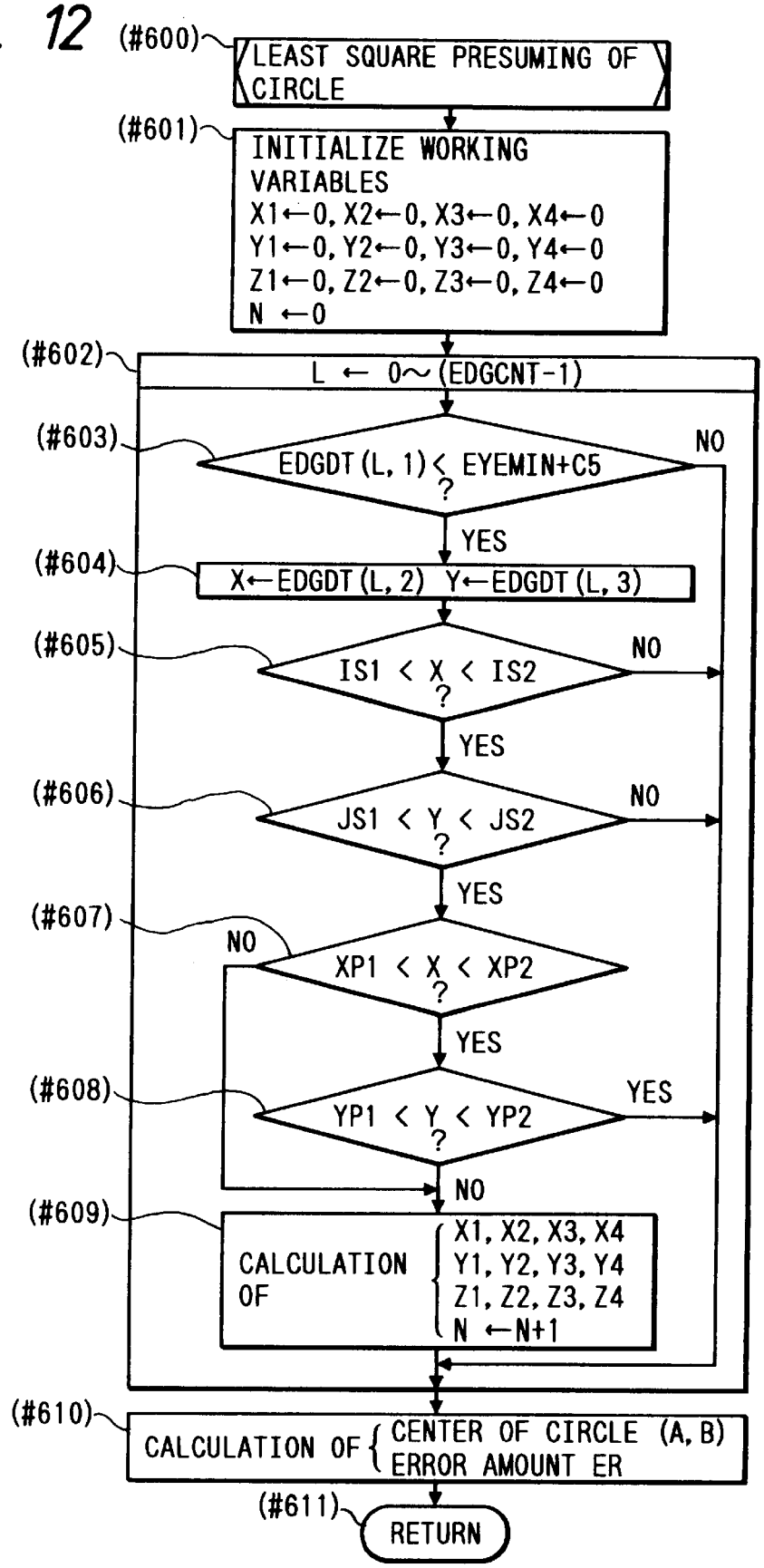
FIG. 12 is a flowchart of selecting points suitable for calculating a pupillary circle from among a plurality of detected pupillary edge points.

The meanings of these variables will be described in conjunction with FIG. 12. To be short, when a pupillary center is to be detected, the variables are used to remove the information of false pupillary edges appearing around the position of a P image.

After the operation of the step 207 terminates, the P-image Detection subroutine is returned at the next step 208.

Description will continue in conjunction with the flowchart of FIG. 6.

When the P-image Detection subroutine terminates at the step 009, a subroutine "Pupillary Edge Detection" is executed at a step 010.

Figure 9:
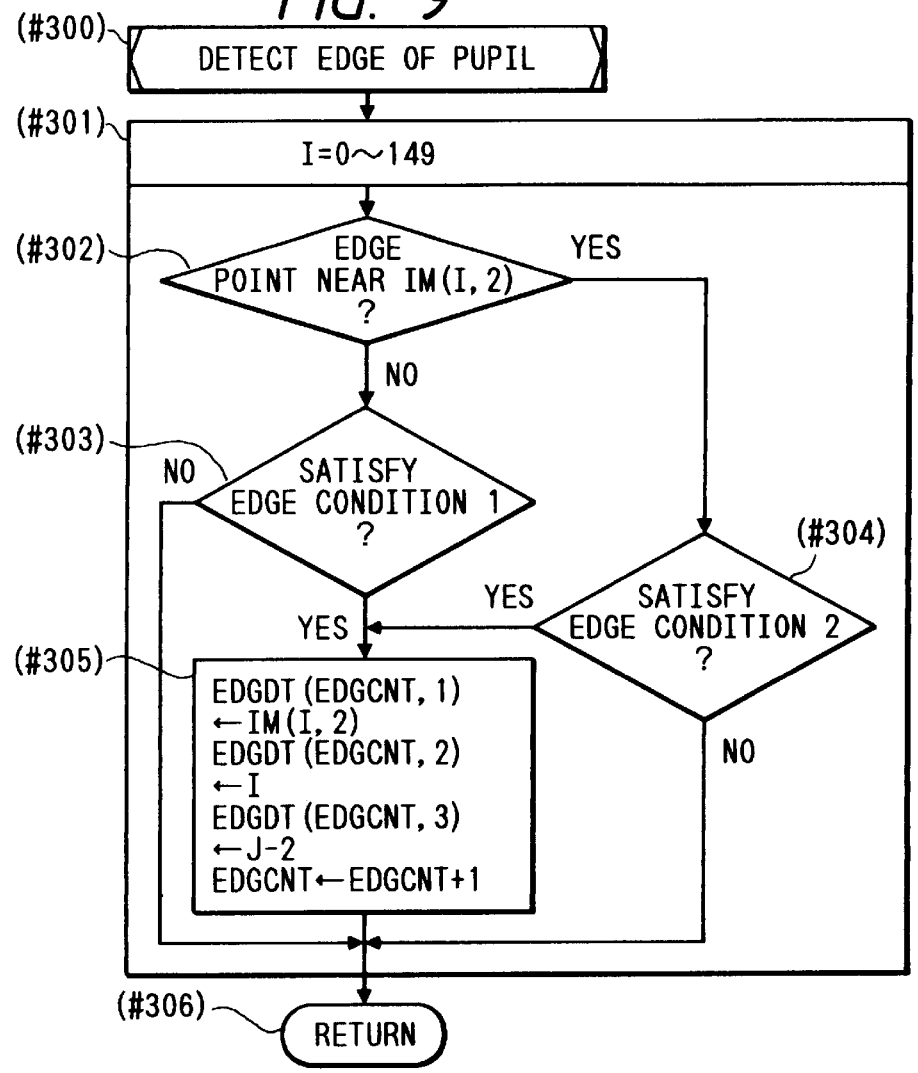
FIG. 9 is a flowchart of detecting pupillary edges points.

Pupillary Edge Detection is a subroutine for detecting the positions of pupillary edge points (points on the border between the iris and pupil) in an eyeball reflection image. FIG. 9 is the flowchart.

When the Pupillary Edge Detection subroutine is called at a step 300, the loop of a step 301 is executed. At the step 301, similarly to the step 201 of FIG. 8, a loop is executed. The loop has a variable I specifying the lateral (x-axis) position in an area sensor.

Within the loop of the step 301, image data is searched for a characteristic indicating a pupillary edge. If a characteristic is found, the positional information is put in memory. The positional information of a pupillary edge is stored as an array variable EDGDT(m, n).

The array variable EDGDT(m, n) has the data format below.

EDGDT(m, 1): luminance at the m-th edge point

EDGDT(m, 2): x coordinate of the m-th edge point

EDGDT(m, 3): y coordinate of the m-th edge point

Herein, m denotes a serial number of an edge point detected during series processing of pupillary edge detection. If M edge points are detected, an array variable EDGDT needs a capacity represented as a product of M by 3 bytes. In the flowchart, detected edge points are counted by incrementing a variable EDGCNT.

At the first step 302 within the loop, it is determined whether an edge point detected in the past resides in the vicinity of image data IM (I, 2). The details will be given below.

The loop variable I of an outermost loop represents the lateral (x-axis) position in the area sensor. An address (I, 2) of an array variable IM (i, k) specifying image data points to a point (coordinates of pixels) which is about to be checked to see if the point coincides with a pupillary edge. An array variable EDGDT (m, n) specifying edge position information is checked to see if points adjoining to the (I, 2) point have been regarded as pupillary edges during past series processing.

A condition for determination used at the step 302 will be described below.

A condition for determination of the step 302 is that {EDGDT (m, 2), EDGDT (m, 3)} equals to:

$$\{(I-1), (J-2)\},$$

$$\{(I-1), (J-3)\}, \text{or}$$

$$\{(I), (J-3)\},$$

$$\{(I+1), (J-3)\}$$

where, m ranges from 0 to (EDGCNT−1).

The coordinates to be verified are {(I), (J−2)}. Therefore, the coordinates {EDGDT (m, 2), EDGDT (m, 3)} sequentially indicate the left, upper left, upper, and right upper points adjacent to the point indicated with the coordinates to be verified.

EDGDT (m, 2) and EDGDT (m, 3) represent the x and y coordinates of the m-th edge point, respectively. Consequently, whether the above condition is met means whether an edge point exists on the left, upper left, upper, or right upper area adjacent to the point indicated with the coordinates to be verified.

At a step 302, if it is determined that an edge point resides in the vicinity of the coordinates (I, J−2), control passes to a step 304. If not, control branches to a step 303. A pupillary edge is identified under other conditions.

Processing to be done when no edge point resides in the vicinity will be described first.

At a step 303, it is determined whether image data of coordinates (I, J−2) to be verified meets conditions for a pupillary edge (referred to as edge conditions 1). Note that the image data of the coordinates (I, J−2) is stored as an array variable area IM (I, 2).

The conditions for determination are specified below.

Edge conditions 1 at the step 303:

$$\{IM(I-1, 2)-IM(I, 2)\}>C3, \{IM(I-2, 2)-IM(I-1, 2)\}<C3, \text{and}$$

$$IM(I, 2)<a \qquad 1.$$

$$\{IM(I+1, 2)-IM(I, 2)\}>C3, \{IM(I+2, 2)-IM(I+1, 2)\}>C3, \text{ and}$$
$$IM(I, 2)<a \qquad 2.$$

$$\{IM(I, 1)-IM(I, 2)\}>C3, \{IM(I, 0)-IM(I, 1)\}>C3, \text{ and } IM(I, 2)<a3. \qquad 3.$$

$$\{IM(I, 3)-IM(I, 2)\}>C3, \{IM(I, 4)-IM(I, 3)\}>C3, \text{ and } IM(I, 2)<a4. \qquad 4.$$

When the above conditions 1 to 4 are met, the coordinates (I, J−2) are regarded to indicate an edge point. However, when a=EYEMIN+C4, EYEMIN specifies the smallest luminance value among luminance values of image data acquired in previous series processing.

Thresholds C3 and C4 are, for example, 3 and 20.

The above conditions are based on the fact that a pupillary edge (border between the iris and pupil) shows a given difference in luminance continuously and that the pupil shows the lowest luminance among other regions in an eyeball reflection image. The conditions 1 and 2 define an edge in the lateral (x-axis) direction of the area sensor, while the conditions 3 and 4, an edge in the longitudinal (y-axis) direction of the area sensor.

When the coordinates (I, J−2) are regarded to indicate a pupillary edge point, control branches from the step 303 to a step 305. The luminance value and coordinates of the edge point are put in memory.

At the step 305, the following information is stored as an array variable area EDGDT (m, k) specifying edge position information:

IM (I, 2) as EDGDT (EDGCNT, 1)

I as EDGDT (EDGCNT, 2)

J−2 as EDGDT (EDGCNT, 3)

IM (I, 2) represents a luminance of the EDGCNT-th edge point. I represents an x coordinate of the edge point. (J−2) represents a y coordinate of the edge point.

Then, the variable EDGCNT specifying the count of detected edge points is incremented by 1.

When the operation of the step 305 terminates, a loop variable I of an outermost loop (representing a lateral position or an x coordinate) is incremented. Then, the sequence after the step 302 in the flowchart of FIG. 9 is carried out.

Next is processing to be done when it is determined at the step 302 that an edge point resides in the vicinity of coordinates (I, J−2).

Control branches to a step 304. Similarly to the step 303, it is determined whether image data of the coordinates (I, J−2) to be verified meets the conditions for a pupillary edge (referred to as edge conditions 2).

The edge conditions 2 are less strict than the edge conditions 1. In this embodiment, conditional expressions are employed using thresholds C3' and C4' as follows:

$$C3'=2, C4'=30$$

Under these conditions, more points are identified as edge points than under the edge conditions 1.

Thus, two kinds of edge conditions are preprogrammed. The underlying idea is that since edge points, in principle, reside contiguously but not independently, if a certain point is an edge point, it is highly probable that adjacent points are also edge points.

If a point is recognized as an edge point under the edge conditions 2 at the step 304, control branches to a step 305. Then, the information of the coordinates is put in memory.

As described previously, the loop of a step 301 is repeated until the loop variable I takes on 149. When edge detection is complete for one line in the lateral (x-axis) direction of an area sensor, control passes to a step 306. Then, the Pupillary Edge Detection subroutine is returned.

Description will continue in conjunction with FIG. 6.

When the Pupillary Edge Detection subroutine of a step 010 terminates, a loop variable J (specifying a y coordinate) of a loop nested outermost at a step 006 is incremented. The processing after a step 007 is repeated until J becomes 99.

When the loop variable J becomes 99, and reading all pixels of an area sensor and other processing are complete, control passes from the step 006 to a step 011.

At steps 011 to 013, the positions of P images and the information of pupillary edges, which are detected within a loop of a step 006, are used to calculate the coordinates of a pupillary center and the direction of a visual axis.

First, at a step 011, a subroutine "Presumed Pupil Area Setting" is called.

Multiple edge points detected by a Pupillary Edge Detection subroutine at a step 010 include not only edge points forming a pupillary circle (circle of a border between the iris and pupil) but also false edge points attributable to various kinds of noise.

Figure 10:
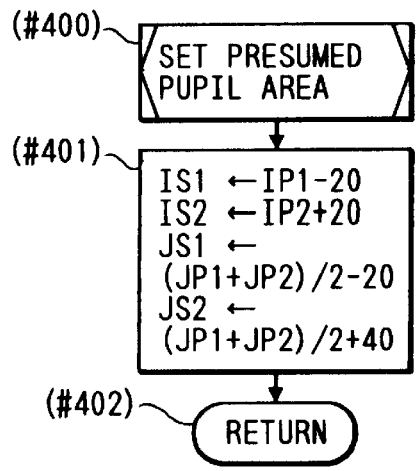
FIG. 10 is a flowchart of setting a presumed area of a pupillary circle.

Presumed Pupil Area Setting is a subroutine for specifying a range of coordinates indicating probable edge points using the positional information of P images and thus removing false edge points. FIG. 10 is the flowchart.

When the Presumed Pupil Area Setting subroutine is called at a step 400, the operation of a step 401 is executed.

At the step 401, a range of the positions of a P image; that is, IP1 to IP2 in the lateral (x-axis) direction and JP1 to JP2 in the longitudinal (y-axis) direction, which has been described for the "P-image Detection" subroutine, is used to calculate a range of coordinates IS1, IS2, JS1 and JS2 of a pupillary circle according to the expressions below.

$$IS1 \leftarrow IP1-20$$

$$IS2 \leftarrow IP2+20$$

$$JS1 \leftarrow (JP1+JP2)/2-20$$

$$JS2 \leftarrow (JP1+JP2)/2+40$$

Probable pupillary edge points are regarded as points existing in a lateral (x-axis) range of IS1 to IS2 and a longitudinal (y-axis) range of JS1 to JS2 in an area sensor.

In an optical system according to the present invention, as shown in FIG. 5A, two P images reside in the upper area within a pupillary circle. Thus, the above expressions are satisfied.

After the calculation of the step 501 is complete, control passes to a step 402. Then, the Presumed Pupil Area Setting subroutine is returned.

Next, a subroutine "Pupillary Center Detection" is called at a step 012 of FIG. 6.

Figure 11:
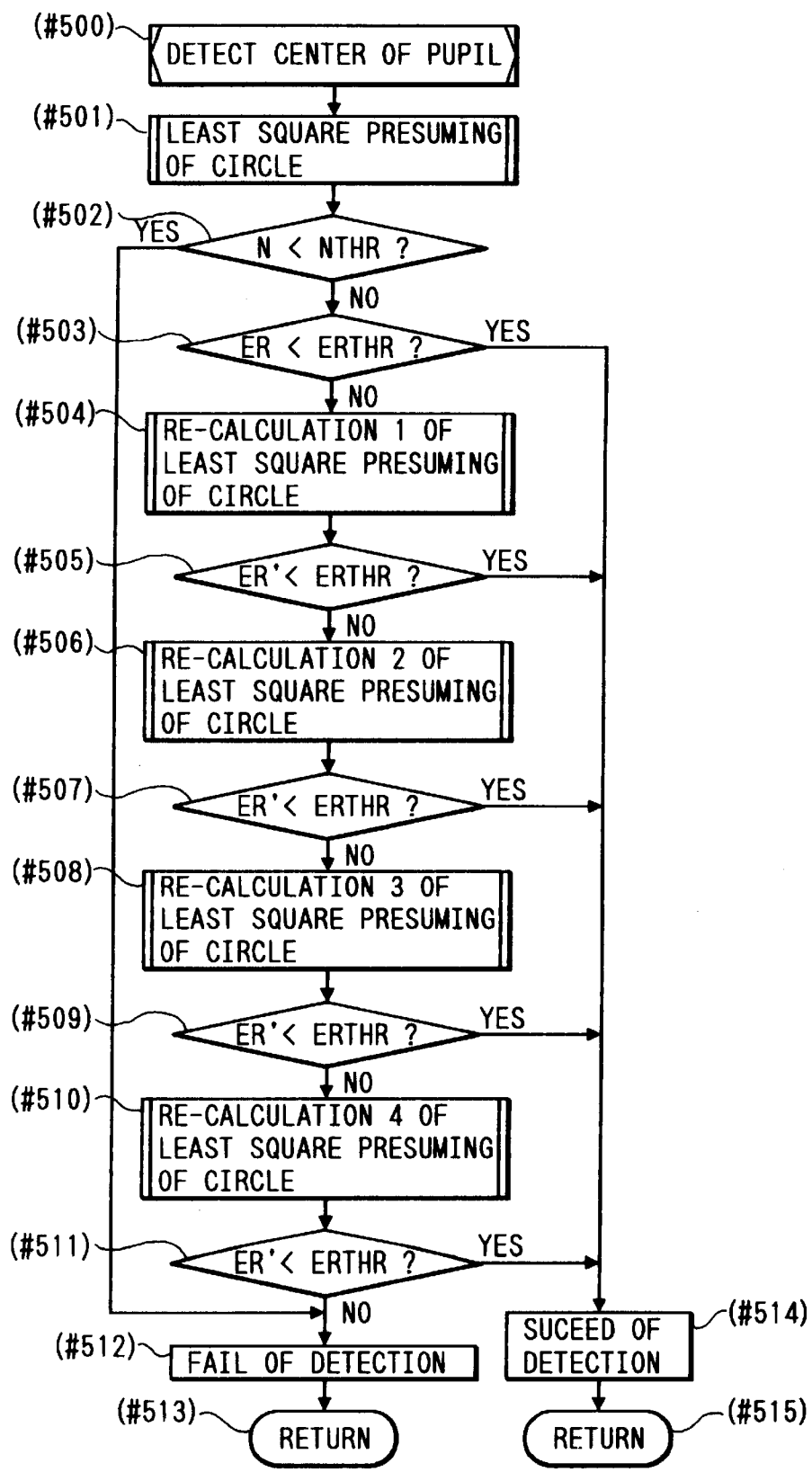
FIG. 11 is a flowchart of detecting a pupillary circle.

Pupillary Center Detection is a subroutine for presuming the shape of a pupillary circle (coordinates of the center, and size) using coordinates of probable pupillary edges. FIGS. 11 to 13 are the flowcharts.

The least squares method is employed for presuming the shape of a pupillary circle. The concept will be described next.

Assuming that the coordinates of a center are (a, b) and a radius is c, the equation of a circle is, needless to say, given as follows:

$$(x-a)^2+(y-b)^2=c^2 \qquad (10)$$

Herein, a, b and c are determined so that a total error ER of multiple observation points (x1, y1), (x2, y2), etc. (xn, yn) given by the expression below will be a minimum.

$$ER=\Sigma[(xi-a)^2+(yi-b)^2-c^2]^2 \qquad (11)$$

ER is the sum of the squares of the distances (errors) in the normal direction of the observation points from a circle determined by a, b and c. The ER value is minimized.

ER is partially differentiated with respect to a, b and c, respectively. Then, each of the partial differentiation equations shall have a solution of 0.

That is to say:

$$\delta ER/\delta a=\Sigma[-4(xi-a)^3-4(xi-a)(yi-b)^2+4c^2(xi-a)]=0 \qquad (12)$$

$$\delta ER/\delta b=\Sigma[-4(yi-b)^3-4(xi-a)^2(yi-b)+4c^2(xi-b)]=0 \qquad (13)$$

$$\delta ER/\delta c=\Sigma[4c^3-4(yi-b)^2c-4(xi-a)^2=0 \qquad (14)$$

where, i ranges from 1 to n.

The following expression is derived from the equation (14):

$$c^2=\Sigma[(xi-a)^2+(yi-b)^2]/n \qquad (15)$$

The expression (15) is assigned to the expressions (13) and (14). Then, X1 to X3, Y1 to Y3 and Z1 to Z3 are defined as follows:

$$X1=\Sigma xi,\ X2=\Sigma xi^2,\ X3=\Sigma xi^3 \qquad (16)\ to\ (18)$$

$$Y1=\Sigma yi,\ Y2=\Sigma yi^2,\ Y3=\Sigma yi^3 \qquad (19)\ to\ (21)$$

$$Z1=\Sigma xiyi,\ Z2=\Sigma xi^2yi,\ Z3=\Sigma xiyi^3 \qquad (22)\ to\ (24)$$

Next, the following equations are defined:

$$V1=X2-X1^2/n \qquad (25)$$

$$V2=Y2-Y1^2/n \qquad (26)$$

$$W1=X3+Z3 \qquad (27)$$

$$W2=Y3+Z3 \qquad (28)$$

$$W3=(X2+Y2)/n \qquad (29)$$

$$W4=Z1-X1Y1/n \qquad (30)$$

$$W5=(Z1-2\cdot X1Y1/n)Z1 \qquad (31)$$

$$W6=X1Y2 \qquad (32)$$

$$W7=X2Y1 \qquad (33)$$

Coordinates a and b of the center of a circle are calculated according to the expressions below.

$$a = \frac{W1V2 - W2W4 - (W6 - Y1Z1)W3}{2(X2V2 - W5 - W6X1/n)} \qquad (34)$$

$$b = \frac{W2V1 - W1W4 - (W7 - X1Z1)W3}{2(Y2V1 - W5 - W7Y1/n)} \qquad (35)$$

A radius c is given by the expression below, which has no direct relation to the calculation of a visual axis (view point) though.

$$c=[W3-2(aX1+bY1)/n+a^2+b^2]^{1/2} \qquad (36)$$

In this embodiment of the present invention, the total error ER is used to evaluate reliability in detecting a pupillary center. The ER is given by:

$$ER = X4 - 4aX3 + 2(2a^2 + d)X2 - 4adX1 + Y4 - 4bY3 + 2(2b^2 + d)Y2 - 4bdY1 + 2(Z4 - 2aZ3 - 2bZ2 + 4abZ1) + d^2n \qquad (37)$$

where, $$X4=\Sigma xi^4 \qquad (38)$$

$$Y4=\Sigma yi^4 \qquad (39)$$

$$Z4=\Sigma xi^2yi^2 \qquad (40)$$

$$d=a^2+b^2-c^2 \qquad (41)$$

Based on the above discussion of calculating values, the flowcharts of FIGS. 11 to 13 will be described.

After a subroutine "Pupillary Center Detection" is called at a step 500, a subroutine "Circle Least Squares Presumption" is invoked at a step 501.

Circle Least Squares Presumption is a subroutine for calculating coordinates (a, b) of the center of a pupillary circle and a total error ER according to the aforesaid expressions. FIG. 12 is the flowchart. The subroutine reviews a smallest luminance value and excludes false pupillary edges using P images.

When the Circle Least Squares Presumption subroutine is called at a step 600, control passes to a step 601.

At the step 601, the working variables for the aforesaid least squares presumptive expression are initialized.

At the next step 602, a loop having a loop variable L is executed. The first half of least squares calculation is carried out using stored pupillary edge information.

Assume that (EDGCNT-1) values of information specifying pupillary edge points are stored as an array variable EDGDT. The loop variable L specifies the order that the values of information are put in memory.

At the first step 603 within the loop, the luminance value of the L-th edge point, EDGDT (L, 1), is compared with (EYEMIN+C5). If the luminance value is larger, control branches to terminate the operation of the current loop variable L.

In this embodiment, series processing is accompanied by reading photoelectric transfer signals from an area sensor. A smallest luminance value used during edge point detection is a transient value that is the smallest only at that time. Therefore, a point detected as an edge point may not have actually been determined using a smallest luminance value. Some points included may not be qualified as edge points. From this viewpoint, the step 603 is provided to evaluate detected edge points using a smallest luminance value determined as a final and to remove points that are unqualified as edge points.

A threshold C5 is, for example, 20.

At the step 603, if it is determined that a luminance value is smaller, control passes to a step 604. The x and y coordinates are temporarily saved as variables X and Y.

At the next step 605, it is determined whether the x coordinate X of the L-th edge point is within an x-axis range of IS1 to IS2. The IS1 and IS2 take on the values calculated by the Presumed Pupil Area Setting subroutine. Thus, control branches so that an edge point outside the range will not be recognized as a pupillary edge point. Then, the loop for the current loop variable L terminates.

At the next step 606, the foregoing determination is made on the y coordinate of the L-th edge point.

If the L-th edge point resides in a presumed pupil area, control passes to a step 607.

At steps 607 and 608, it is determined whether the coordinates of the L-th edge point indicate a point in the vicinity of a P image.

XP1, XP2, YP1 and YP2 assume the values determined by the P-image Detection subroutine. When the x coordinate of the edge point ranges from XP1 to XP2 and the y coordinate ranges from YP1 to YP2, control branches so that the operation of the current loop variable L will terminate. This is because, in the optical system of this embodiment, two P images appear in the upper area of a pupillary circle. The skirts of the spot-like P images are likely to meet the aforesaid edge conditions, and thereby be detected as false pupillary edges. The branching aims to remove these false pupillary edges.

The information of coordinates of edge points that have passed the determinations of the steps 603 to 608 are subjected to least squares at a step 609.

The calculation of the step 609 is achieved by executing the aforesaid expressions (16) to (24) and (38) to (40). In addition, the number N of edge points used for the calculation is detected.

In a loop of a step 602, all the stored edge points numbering (EDGCNT−1) are processed. After the processing terminates, control passes to a step 610.

At the step 610, the expressions (25) to (35) and (37) to (41) are executed to calculate coordinates (a, b) of the center of a pupillary circle and a total error ER.

Then, control passes to a step 611. The Circle Least Squares Presumption subroutine is returned.

When the Circle Least Squares Presumption subroutine terminates at the step 501 in FIG. 11, control passes to the next step 502.

At the step 502, the number of data values used for presuming a circle is compared with a threshold NTHR. If N<NTHR, it is determined that the result of detection is less reliable because of a small number of data values. Then, control branches to a step 512. A detection failure is identified.

The NTHR is, for example, 30.

At the step 502, if N is equal to or larger than NTHR, the total error ER is compared with a threshold ERTHR. If ER<ERTHR, it is determined that the error is so negligible that the result of detection is reliable. Then, control branches to a step 514. A detection success is identified.

The threshold ERTHR is, for example, 10000.

Figure 16:
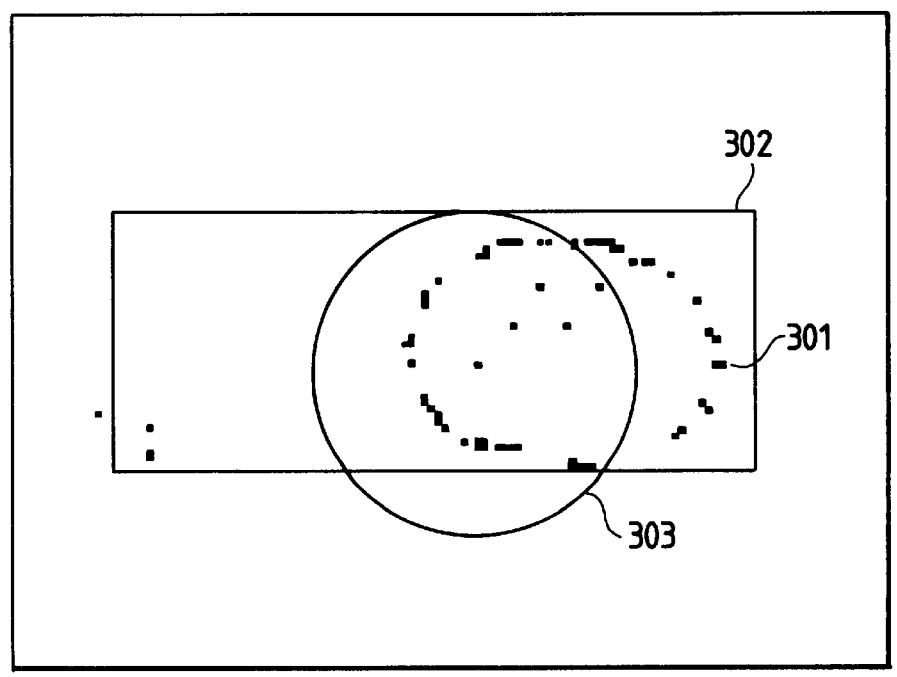
FIG. 16 shows a pupillary circle calculated without taking into account a total error of squares.

At a step 503, if ER is equal to or larger than ERTHR, it is determined that the error is too large despite a large number of data values. Recalculation is executed at and after a step 504. The large error may be attributable to the fact that false edge points inconsistent with a pupillary circle have been involved in calculation. FIG. 16 shows an example of the processing. In FIG. 16, 301 denotes an extracted edge point. 302 is a range of edge points used for calculation. 303 denotes a calculated presumptive circle. In this case, the presumptive circle has a very different shape from a correct circle, because false edge points on the left side have been used for calculation. This increases the total error. Then, the edge points whose x and y coordinate values are very small and large are excluded from calculation. Then, it is checked if the error shrinks.

At a step 504, a subroutine "Circle Lease Squares Presumption Recalculation 1" is called.

Circle Lease Squares Presumption Recalculation 1 is a subroutine for excluding edge points that are used for calculation of least squares presumption but reside in the upper part of an area sensor (one fifth of all edge points), then rerunning the calculation of least squares presumption. FIG. 13 is the flowchart.

When the Circle Lease Squares Presumption Recalculation 1 subroutine is called at a step 700, variables are stored at a step 701 as shown in FIG. 13.

Variables XS1 to ZS4 are working variables to be specified when all edge points calculated at a step 501 are used. A one-fifth value of the number of all edge points is stored as the number of edge points to be excluded.

At a step 702, working variables of expressions are initialized in the same manner as at a step 601. Then, control passes to a step 703.

At the step 703, a loop similar to that at a step 602 is executed. Within the loop, least squares calculation is performed on edge points to be excluded.

In this embodiment of the present invention, an area sensor is read vertically from top to bottom. This means that the edge points are stored as an array variable EDGDT (m, k) specifying edge information in descending order of y coordinate values. Therefore, if m of EDGDT (m, k) is incremented sequentially from 0, edge points can be accessed in descending order of y coordinate values.

At the first step 704 within the loop of the step 703, it is determined whether an edge point (X, Y) is qualified as a pupillary edge point. The processing is identical to that from the steps 603 to 608.

If an edge point is recognized as qualified, control passes to a step 705. Then, the same calculation as that of the step 609 is executed at the step 705.

At a step 706, the number N of newly-calculated edge points is compared with the number M of edge points to be excluded. When M new edge points have been calculated, control branches. Then, the outermost loop of the step 703 is suspended. If the number of new edge points has not reached M, the loop variable L is incremented. Then, the operations of the step 704 and thereafter are restarted.

When M new edge points have been calculated, control branches to a step 708. The center (a, b) of a pupillary circle and a total error ER' are recalculated. At the time of recalculation, the following expressions are executed:

$$X1 = X1S - X1 \qquad (16')$$

$$X2 = X2S - X2 \qquad (17')$$

$$X3 = X3S - X3 \qquad (18')$$

$$Y1 = Y1S - Y1 \qquad (19')$$

$$Y2 = Y2S - Y2 \qquad (20')$$

$$Y3 = Y3S - Y3 \qquad (21')$$

$$Z1 = Z1S - Z1 \qquad (22')$$

$$Z2 = Z2S - Z2 \qquad (23')$$

$$Z3 = Z3S - Z3 \qquad (24')$$

$$X4 = X4S - X4 \qquad (38')$$

$$Y4 = Y4S - Y4 \qquad (39')$$

$$Z4 = Z4S - Z4 \qquad (40')$$

The expressions (25) to (35) and (37) to (41) are recalculated to obtain a new pupillary center (a, b) and a new total error ER'. The expressions (16) to (40) are preprogrammed as series processing. Therefore, all data need not be recalculated. Data to be excluded is added up (or accumulated), which is, then subtracted from the original value.

After recalculation is complete, control passes to a step 709. Then, the Circle Least Squares Presumption Recalculation 1 subroutine is returned.

When the operation of the step 504 in FIG. 11 is complete, control passes to a step 505. The recalculated total error ER' is compared with a threshold ERTHER. If ER' is smaller, it is determined that exclusion succeeds. Then, control branches to a step 514. A detection success is identified.

If the ER' is still larger, control passes to a step 506. Then, another subroutine "Circle Least Squares Presumption Recalculation 2" is called.

Figure 13A:
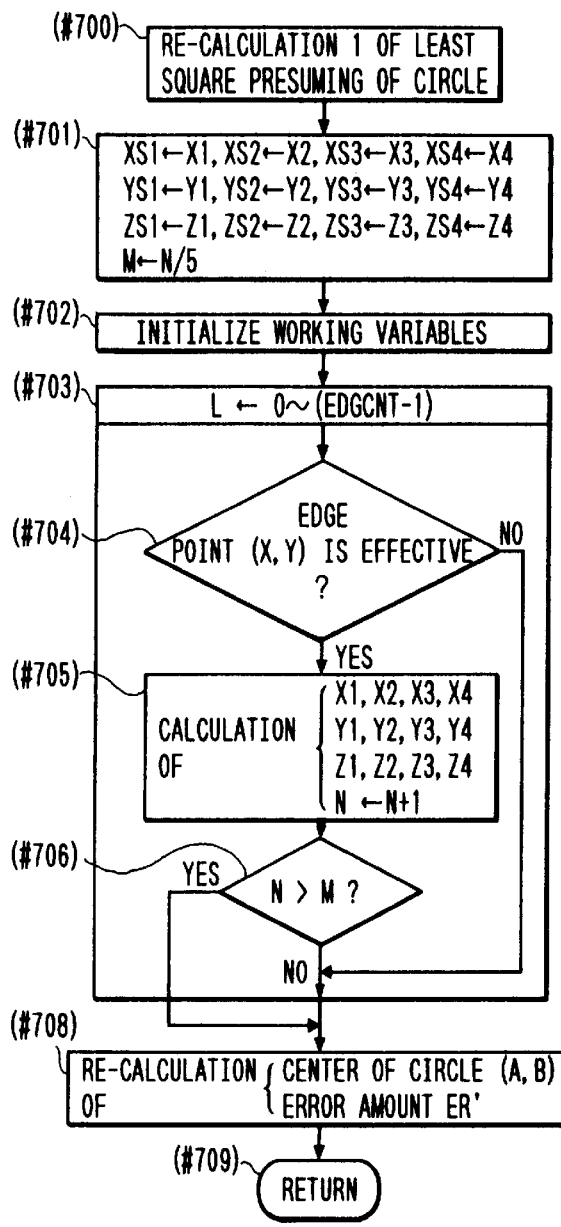
FIGS. 13A to 13D are flowcharts of removing pupillary edge points unsuitable for calculating a pupillary edge.
Figure 13B:
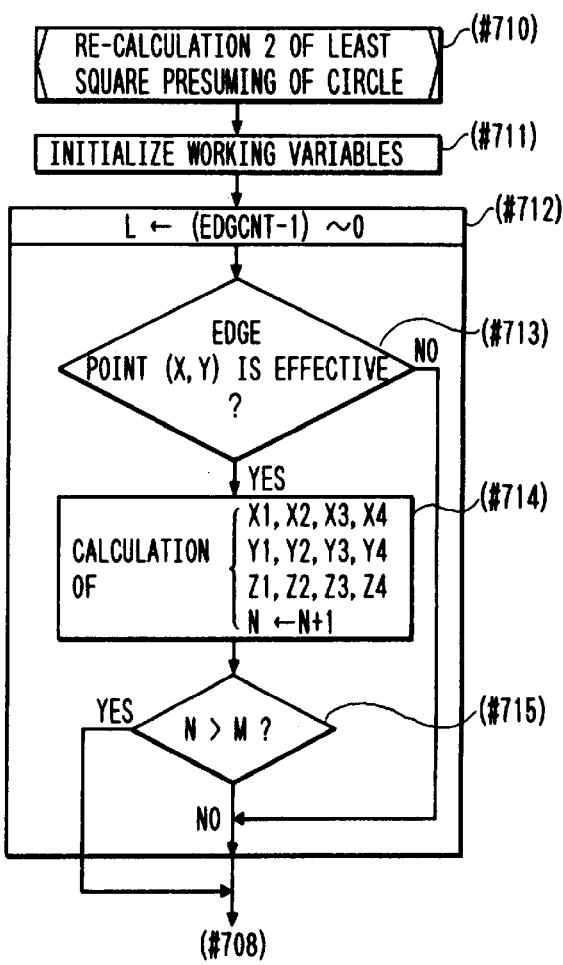

Circle Least Squares Presumption Recalculation 2 is a subroutine for excluding edge points that are used for calculation of least squares presumption but reside in the lower part of an area sensor (one fifth of all edge points), then rerunning the calculation of least squares presumption. FIG. 13B is the flowchart.

Recalculation 2 is almost the same as Recalculation 1. Unlike Recalculation 1, edge points are excluded in ascending order of y coordinate values. Therefore, a loop variable L is decremented sequentially from (EDGCNT-1) at a step 712. Other operations are identical to those of Recalculation 1. The description will, therefore, be omitted.

Description will continue in conjunction with FIG. 11.

When the Circle Least Squares Presumption Recalculation 2 subroutine terminates at a step 506, control passes to a step 507. A recalculated total error ER' is compared with a threshold ERYHR. If ER' is smaller, it is determined that exclusion succeeds. Then, control branches to a step 514. A detection success is identified.

If the total error ER' is still larger, control passes to a step 508. Then, another subroutine "Circle Least Squares Presumption Recalculation 3" is called.

Figure 13C:
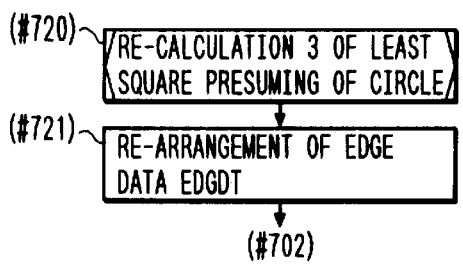

Circle Least Squares Presumption Recalculation 3 is a subroutine for excluding edge points that are used for calculation of least squares presumption but reside in the left part of an area sensor (one fifth of all edge points), then rerunning the calculation of least squares presumption. FIG. 13C is the flowchart.

When the Recalculation 3 subroutine is called at a step 720, values stored as an array variable EDGDT (m, k) specifying edge information are rearranged at a step 721.

As described previously, edge points are saved as EDGDT (m, k) in descending or ascending order of values of y coordinates in an area sensor. When x coordinates are handled, the data stored as EDGDT must be rearranged.

The x coordinates of edge points are stored as EDGDT (m, 2). Then, the x coordinate values are stored by executing well-known Sort. Thus, edge information whose x coordinate values are arranged in ascending order can be stored as EDGDT.

After rearrangement is executed, control branches to a step 702. After that, by performing the processing identical to that of Recalculation 1, recalculation can be achieved with edge points existing in the right and left parts of the area sensor excluded.

When the Circle Least Squares Presumption Recalculation 3 subroutine terminates at a step 508 of FIG. 11, control passes to a step 509. A recalculated total error ER' is compared with a threshold ERTHER. When ER' is smaller, even if exclusion succeeds, control branches to a step 514. Then, a detection success is identified.

If the total error ER' is larger, control passes to a step 510. Then, another subroutine "Circle Least Squares Presumption Recalculation 4" is called.

Figure 13D:
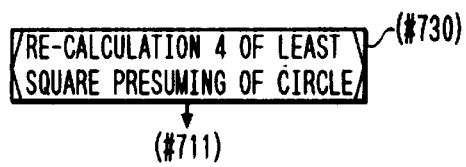

Circle Least Squares Presumption Recalculation 4 is a subroutine for excluding edge points that are used for calculation of least squares presumption but reside in the right part of an area sensor (one fifth of all edge points), then rerunning the calculation of least squares presumption. FIG. 13D is the flowchart.

Edge points are stored as an array variable EDGDT (m, k) in ascending order of x coordinate values. To exclude edge points in descending order of x coordinate values, EDGDT (m, k) must be treated similarly to that in Recalculation 2. Then, when a subroutine "Recalculation 4" is called, control branches to a step 711 right away. The same processing as Recalculation 2 is carried out.

Description will continue in conjunction with FIG. 11.

When the Circle Least Squares Presumption Recalculation 4 subroutine terminates at a step 510, control passes to a step 511. Then, a recalculated total error ER' is compared with a threshold ERTHER. When ER' is smaller, even if exclusion succeeds, control branches to a step 514. Then, a detection success is identified.

If the total error ER' is still larger, control passes to a step 512. It is determined that the aforesaid exclusion fails. Control passes to the step 514, and a detection failure is identified.

At the step 512 or 514, it is finally determined that a pupillary center is detected. At the step 513 or 515, the Pupillary Center Detection subroutine is returned.

Figure 14:
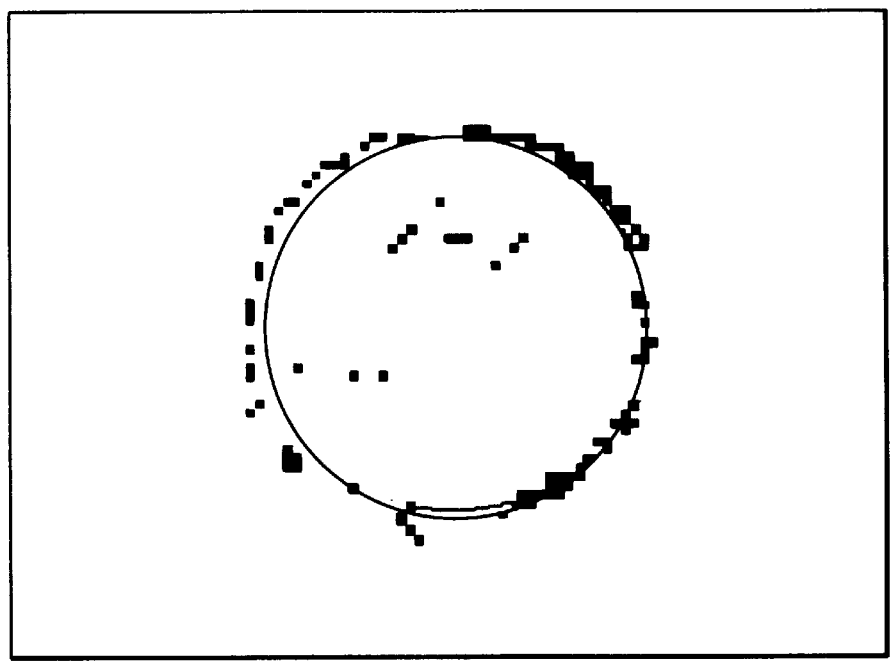
FIG. 14 shows a plurality of edge points and a pupillary circle calculated using the plurality of edge points according to the present invention.

FIG. 14 shows an example of least squares presumption adopted in this embodiment of the present invention.

FIG. 14, a black dot represents an edge point. Based on these edge points, a presumptive pupillary circle has been drawn.

Description of FIG. 6 will be resumed.

When Pupillary Center Detection terminates at a step 012, control passes to a step 013. Then, a subroutine "Visual Axis Detection" is called.

Visual Axis Detection is a subroutine for detecting a visual axis (view point) using the positions of P images and the center position of a pupillary circle, which have been detected so far.

In principle, similarly to the aforesaid known example, the rotation angle with respect to the optical axis of an eyeball, θ, is calculated according to the expression (2).

In this embodiment of the present invention, a pupillary center is specified with x and y coordinates. Therefore, unlike in the known example, not only the lateral direction of a visual axis but also the longitudinal direction can be detected on the basis of the same concept.

When visual axis detection is complete, control passes to a step 014. A sequence of operations terminates.

In the embodiment described so far, a circle is adopted as a figure presumed using the least squares method. However, the figure is not limited to a circle. Since the actual human pupil is not always a circle, an ellipse may be adopted.

As for exclusion of false observation points, in this embodiment, false points are excluded in ascending or descending order of x- or y-coordinate values. Then, recalculation is performed. Alternatively, observation points may be excluded in descending order of distances from the center of a presumptive circle. Then, false observation points are excluded from the presumptive circle by evaluating their distances from the circumference of the circle. In any case, the present invention is advantageous.

As described previously, according to the present invention, the least squares method is used to create a presumptive pupillary circle, and a total error represented as a sum of squares of errors or distances of observation points from the presumptive circle is calculated at the same time. If the total error is smaller than a given value, the circular information of the pupillary circle is calculated. If the total error exceeds the given value, a combination of observation points to be calculated is reformed, then calculation of pupillary circle presumption is rerun. Thereby, an error of least squares due to the presence of false observation points can be minimized, thus realizing a visual axis detecting device with high precision.

What is claimed is:

1. A view point detecting device, comprising:

light receiving means, having a plurality of photoelectric transfer element arrays, for receiving light from an observer's eyeball;

first storage means for storing positional information of photoelectric transfer elements outputting signals representing Purkinje images;

second storage means for storing positional information of photoelectric transfer elements that indicate characteristic points representing the pupil of the observer's eyeball;

calculating means for performing a least squares calculation using a plurality of values of positional information stored in said second storage means to calculate circular information for a presumed pupillary circle of the eyeball; and detecting means for detecting a view point using the position information stored in said first storage means and the circular information.

2. A view point detecting device according to claim 1 further comprising a means for disabling said calculation when the number of positional information values stored in said second storage means is smaller than a given value.

3. A view point detecting device according to claim 1 further comprising control means for identifying a detection failure when a total error of squares said calculating means calculates exceeds a given value.

4. A view point detecting device according to claim 1 wherein said second storage means stores luminance values, said device further comprising a holding means for holding the smallest luminance value among the luminance values most recently read from photoelectric transfer elements of said light receiving means that are included in said plurality of values of positional information stored in said second storage means, and said calculating means comprising means for comparing a given luminance value based on the smallest luminance value held in said holding means and a plurality of luminance values stored in said second storage means, then calculating pupil-related information using a plurality of values of positional information of photoelectric transfer elements having smaller luminance values.

5. A view point detecting device, comprising:

light receiving means, having a plurality of photoelectric transfer element arrays disposed in a plurality of lines, for receiving light from an observer's eyeball;

first storage means for storing photoelectric transfer signals originating from a portion of the plurality of lines of said photoelectric transfer element arrays in said light receiving means, a capacity for lines of said photoelectric transfer element arrays of said first storage means being less than a capacity for the lines of said photoelectric transfer element arrays of said light receiving means;

second storage means for storing positional information of photoelectric transfer elements that provide photoelectric transfer signals representing characteristic points of an eyeball;

signal processing means for repeatedly effecting signal processing such that after a line of signals from said photoelectric transfer element arrays is stored in said first storage means, said signal processing means executes processing to extract a signal position representing characteristic points of an eyeball using the lines stored in said first storing means and stores the signal position in said second storage means, and then, after a next line of signals from said photoelectric transfer element arrays is stored in said first storage means, said signal processing means executes processing using the lines stored in said first storing means to extract a signal position representing characteristic points of the eyeball and stores the signal position in said second storage means; and detecting means for detecting a visual axis direction using said positional information stored in said second storage means.

6. A view point detecting device according to claim 5, wherein said first storage means comprises a RAM.

7. An apparatus according to claim 5, wherein said second storage means stores a signal for indicating a Purkinje image.

8. An apparatus according to claim 5, wherein said second storage means store a signal for indicating an edge portion of a pupil.

9. An apparatus according to claim 5, wherein said detection means starts an operation of detection of the visual axis when processing by said processing means is completed.

10. A signal processing apparatus comprising:

a plurality of arrays of photoelectric converting elements disposed in a plurality of lines;

memory means for storing signals from a portion of the plurality of lines of said photoelectric converting elements, a capacity for lines of said photoelectric converting elements of said memory means being less than a capacity for lines of said plurality of arrays of photoelectric converting elements;

signal processing means for executing signal processing to extract a characteristic signal from the signals of the lines stored in said memory means; and control means for causing said signal processing means to perform signal processing for extracting characteristic points after causing said memory means to store signals from a line of said photoelectric converting elements, and then causing said signal processing means to perform signal processing for extracting characteristic points after causing said memory means to store a next line of signals from said photoelectric converting elements.

11. A signal processing apparatus according to claim 10, wherein said control means comprises means for controlling said signal processing means and said memory means to alternately repeat a signal processing operation and a storing operation.

12. A signal processing apparatus according to claim 10, wherein said control means comprises a microcomputer.

13. A signal processing apparatus according to claim 10, wherein said signal processing means comprises means for extracting a characteristic signal relating to a Purkinje image.

14. A signal processing apparatus according to claim 13, wherein said signal processing means further comprises means for extracting a characteristic signal indicating a border between a pupil and an iris of an eyeball.

15. A signal processing apparatus according to claim 14, further comprising detection means for detecting a visual axis using the signal indicating the border and the signal relating to the Purkinje image.

16. A signal processing apparatus according to claim 10, wherein said memory means comprises a RAM.

17. An apparatus according to claim 10, further comprising visual axis detection means for detecting a visual axis based on the characteristic signal of said signal processing means.

18. An apparatus according to claim 17, wherein said visual axis detection means performs an operation of detection of the visual axis when the operation of said control means is completed.

* * * * *

UNITED STATES PATENT AND TRADEMARK OFFICE
CERTIFICATE OF CORRECTION

PATENT NO. : 5,848,175

DATED : December 8, 1998

INVENTOR(S) : Akira AKASHI

It is certified that error appears in the above-identified patent and that said Letters Patent is hereby corrected as shown below:

COLUMN 2:

Line 8, "where," should read --where--.

COLUMN 12:

Line 29, "image;" should read --image,--.

COLUMN 16:

Line 62, "is," should read --is--.

COLUMN 18:

Line 21, "FIG. 14," should read --In FIG. 14,--.

UNITED STATES PATENT AND TRADEMARK OFFICE
CERTIFICATE OF CORRECTION

PATENT NO. : 5,848,175

DATED : December 8, 1998

INVENTOR(S) : Akira AKASHI

It is certified that error appears in the above-identified patent and that said Letters Patent is hereby corrected as shown below:

COLUMN 20:

Line 19, "store" should read --stores--.

Signed and Sealed this

Thirty-first Day of October, 2000

*Attest:*

Q. TODD DICKINSON

*Attesting Officer*  *Director of Patents and Trademarks*